United States Patent [19]

Kastelic, Jr.

[11] 4,415,189

[45] Nov. 15, 1983

[54] LOCK SYSTEM FOR REMOVABLE AUTOMOBILE ROOFS

[75] Inventor: Frank M. Kastelic, Jr., Warren, Mich.

[73] Assignee: Falk, Kastelic, Heartwell, Inc., Warren, Mich.

[21] Appl. No.: 240,751

[22] Filed: Mar. 5, 1981

[51] Int. Cl.³ .............................................. E05C 3/08
[52] U.S. Cl. .................................... 292/196; 411/910; 292/1
[58] Field of Search ................... 292/196, 206, 105, 1; 411/910

[56] References Cited

U.S. PATENT DOCUMENTS

| | | | |
|---|---|---|---|
| 3,047,321 | 7/1962 | Gander | 292/196 X |
| 3,129,025 | 4/1964 | Krueger | 292/196 X |
| 3,130,994 | 4/1964 | Balducci | 292/206 X |
| 4,078,843 | 3/1978 | Bozich | 292/206 X |
| 4,366,683 | 1/1983 | Lobbi et al. | 292/196 |

FOREIGN PATENT DOCUMENTS 939663 10/1963 United Kingdom ............... 292/206

OTHER PUBLICATIONS

"Holo-Krome" catalog dated 1979, pp. 4 and 23.

Primary Examiner—Richard E. Moore
Attorney, Agent, or Firm—Hill, Van Santen, Steadman & Simpson

[57] ABSTRACT

An anti-tamper fastening screw has an actuating head which can be accessed only by a special tool and can thus be used effectively in a locking system provided for use with removable automobile roof latching mechanisms. The threaded screw has a specially keyed and tooled head adjusted to be inserted through two holes and held in position by mating threads to retain a roof component in locked position. A special tool is provided which is operatively engageable with the keyed head of the fastening screw to prevent unauthorized removal of the detachable roof without utilizing the special tool.

4 Claims, 6 Drawing Figures

U.S. Patent  Nov. 15, 1983  Sheet 1 of 2  4,415,189
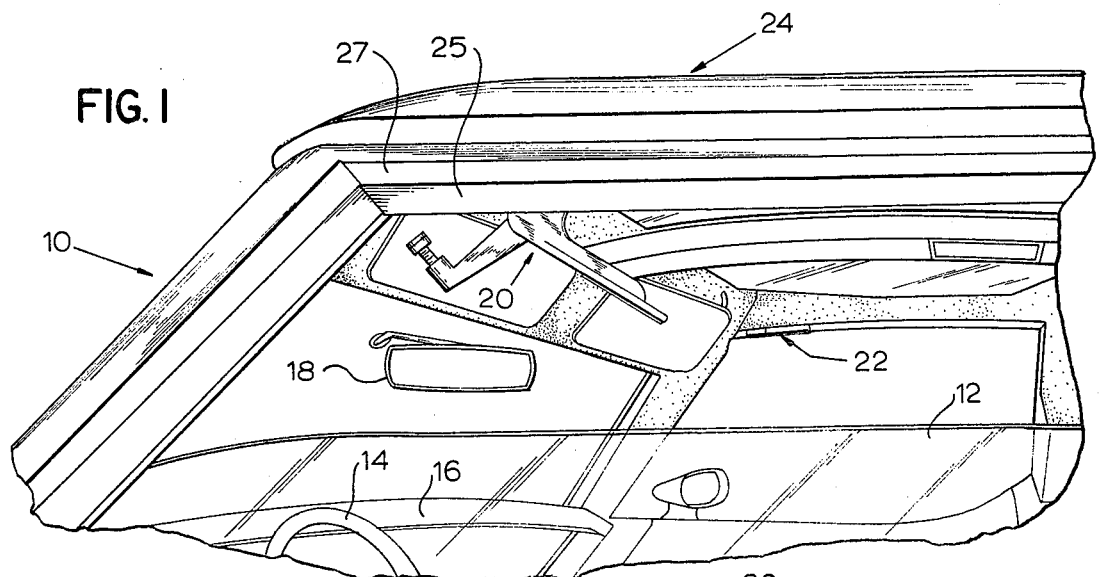
FIG. 1
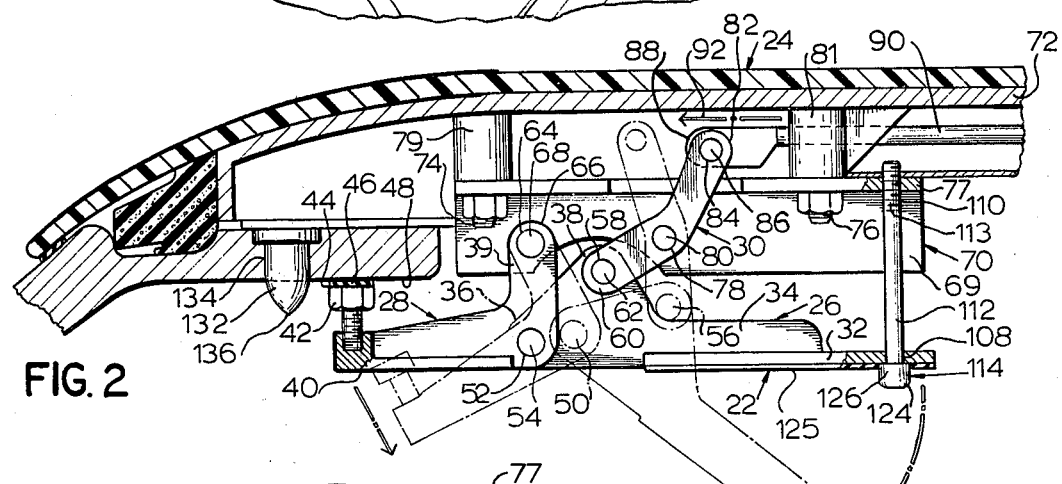
FIG. 2
FIG. 3
FIG. 4

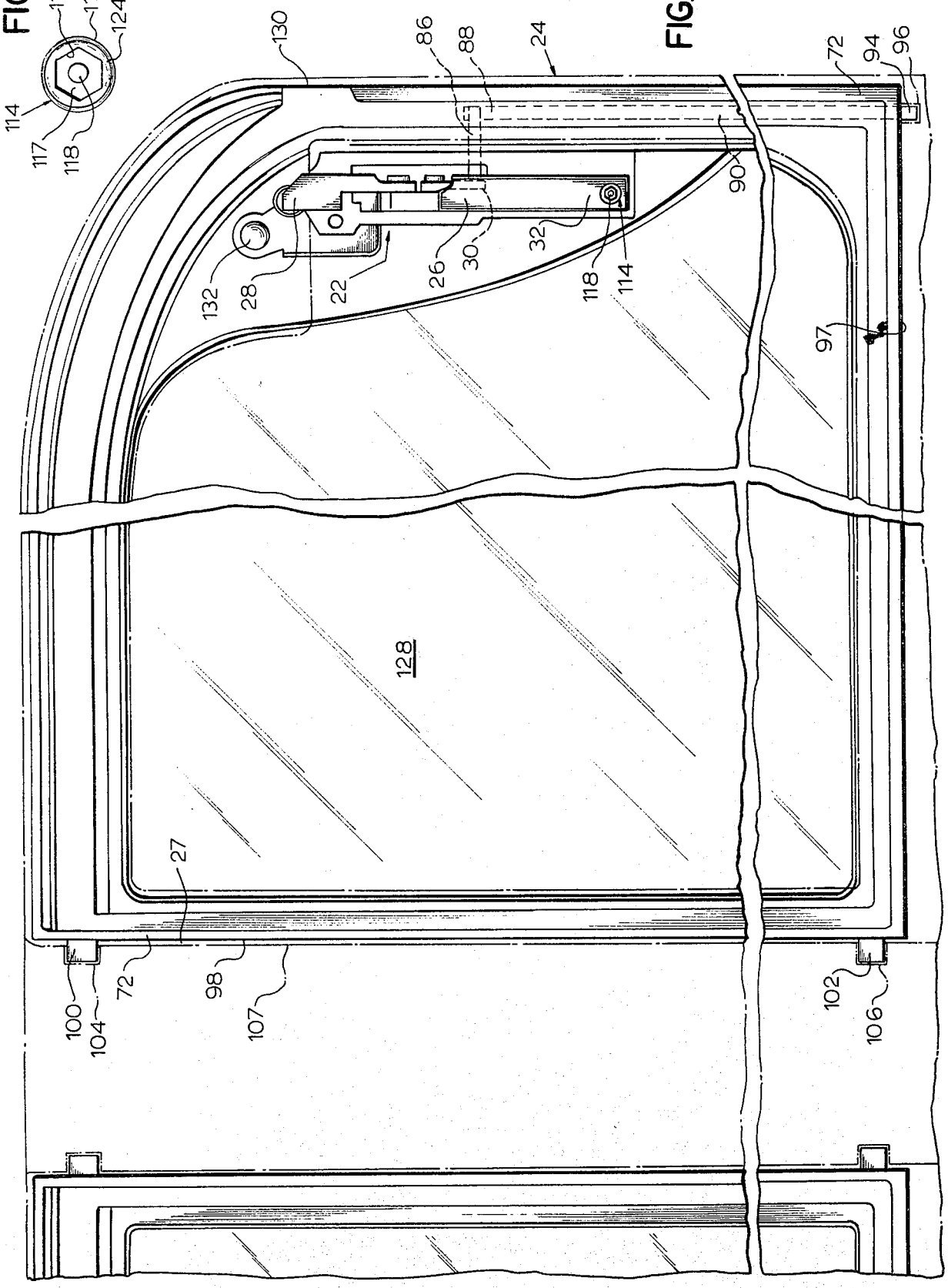

LOCK SYSTEM FOR REMOVABLE AUTOMOBILE ROOFS

BACKGROUND OF THE INVENTION

1. Field of the Invention

This invention relates to a locking mechanism and system and more specifically to a locking mechanism and system for locking a latch used on a removable automobile roof.

2. Description of the Prior Art

Latching mechanisms used in retaining removable roofs on automobiles are generally comprised of a lever arm which is pivotable between a locked and unlocked position and which mechanically operates singly or jointly a pressure pad and a locking pin which cooperate with the frame members of the automobile to retain the removable top in position. Generally, a simple flip of the lever arm is all that is required to disengage the latch mechanism which allows for quick and easy removal of the removable roof.

While this simple latching and unlatching procedure is convenient for the owner or operator of the automobile, it is equally convenient for a thief who wishes to steal the removable roof or to gain entry to a locked automobile by manipulating a tool in such a manner as to pivotally release the lever activated latch.

Although the American public apparently continues to desire an automobile which results in an "open air" feeling, which the convertible top automobile provided, American automobile makers no longer make such a vehicle in any quantity, due to safety and other considerations. However, the auto makers instead have been producing automobile models such as the General Motors Chevrolet Corvette in which a portion of the rigid roof is removable. The automobile customer has a choice of types of removable roofs, one being the standard opaque metallic roof and the other being an optional (and expensive) transparent glass-plastic roof.

Because of the relatively high cost (and thus high resale value) of these removable transparent roofs, their standardized interchangeable configuration and their ease of removal, there has been a large number of thefts of these roofs.

The removal of these roofs when the automobile doors are left in an unlocked condition is quite easily accomplished by simply flipping the latch lever arm and sliding the roofs out of position. However, having the doors of the automobile locked does not preclude easy removal of the roofs. Since the latch mechanism is generally attached to the removable roof frame in a location adjacent the top of the side window of the car, and since there is generally a pliable foam rubber type of material into which the top of the window is received, a flat tool is easily introduced between the top of the window and the pliable foam rubber material which can be positioned against the lever arm portion of the latching mechanism to quickly and easily release the latch. At this point, the roof can be slid from its original position and easily removed.

Thus, owners of automobiles with the less desirable opaque removable roofs are not immune from theft since there may be other items in the car or the car itself in which the thief is interested. Since the relative ease with which the latch mechanism can be disengaged greatly facilitates the undesired removal of these roofs, there has been a longstanding need for a device which would hamper the unauthorized removal of these roofs.

SUMMARY OF THE INVENTION

The present invention provides a means for hampering the unauthorized removal of removable automobile roofs which utilize a lever activated latching mechanism which can be easily retrofitted into existing automobile roof latching mechanisms. A first hole is provided in the lever arm of the latch and a second threaded hole is provided in the frame of the removable roof, these holes are aligned so that a fastening device such as a threaded screw can be inserted through these two holes and held in position by mating threads to retain the lever arm in a locked position. In this manner the lever arm of the latch mechanism is held immobile preventing the latch from being moved to an open position by use of a tool from the outside of a locked automobile.

To further hamper the unauthorized removal of these roofs in the case when the automobile is left unlocked, the screw fastener is provided with a specially keyed head such as a hex socket having an internal socket head pin therein which requires the use of a specially designed wrench tool to rotate the screw.

The length of the securing screw fastener would be such as to add approximately 30 seconds to the removal process of the roof by a person in possession of the special wrench tool. This introduces a critical disabling factor that should deter most would-be thieves and adds a time factor that would deter even a thief equipped with the special tool from continuing his clandestine operation. The legitimate removal of the roof by an authorized person utilizing the special wrench tool is not unduly burdened.

Thus, removal of the roofs is precluded when the auto mobile is in the locked condition, barring a breaking of the windows, and the likelihood of unauthorized removal of the roofs when the automobile is unlocked, is greatly reduced.

DESCRIPTION OF THE DRAWINGS

FIG. 1 is a partial perspective view of the interior of an automobile having a removable roof and showing an exemplary latching mechanism in the foreground in the unlatched position.

FIG. 2 is a partial sectional view showing the details of the removable roof frame and the latching mechanism in the latched and unlatched positions and showing the lock device to be used in conjunction with the latch.

FIG. 3 is an exploded view of the locking system shown in FIG. 2.

FIG. 4 is a partial sectional view showing the special keying arrangement of the locking screw and wrench tool.

FIG. 5 is an end view of the anti-tampering head on the screw.

FIG. 6 is a partial plan view of the interior of an automobile with the removable roof in place and the latching mechanism in a latched position.

DESCRIPTION OF THE PREFERRED EMBODIMENTS

While the anti-tamper screw of the present invention is of general utility, a special application is made to a removable vehicular roof assembly.

FIG. 1 shows the interior of an automobile 10 as seen from the outside of the automobile 10 and looking in through a partially opened side window 12 on the driver's side such that a steering wheel 14, dash board 16, and a rear view mirror 18 are visible. Also visible is a latching mechanism 20 on the driver's side of the roof in an unlatched position and a similar latching mechanism 22 on the passenger side of the roof in a latched position. The latches 20, 22 are used to secure a removable roof portion 24 to the top of the automobile 10.

As seen in FIG. 1, the latching mechanism 20 is attached to the removable roof 24 adjacent where the top of the side window 12 would be when it is in the closed position. A resilient foam rubber type seal 25 seated in a frame 27 of the automobile 10 receives the top of the side window 12 to seal out wind and water.

The latching mechanism 20, 22 is best seen in FIG. 2 where the exemplary mechanism is shown in solid lines at 22 in the latched or closed position and in phantom at 20 in the unlatched or open position.

The latching mechanism 22 is comprised of a lever arm 26, a bell crank 28 and a link member 30.

The lever arm 26 has a generally flat rearwardly extending handle portion 32 and a perpendicular upstanding portion 34 having a rounded front end 36 and a vertical rounded ear 38. The bell crank 28 has an upstanding arm 39 and a forwardly extending arm 40 which carries an upstanding stop member 42 which has on its top end 44 a resilient pad 46 which abuts against a flat surface portion 48 of the fixed frame 27 of the automobile 10.

The lever arm 26 has a hole 50 at the rounded front end 36 which aligns with a similar hole 52 at the apex of the bell crank 28 and in which a pivot pin 54 is secured such that the lever arm 26 and the bell crank 28 are pivotally connected. The lever arm 26 has a second hole 56 formed in the vertical rounded ear 38 which is aligned with a similar hole 58 at a first end 60 of the link member 30 in which is secured a pivot pin 62 such that the lever arm 26 and the link member 30 are pivotally connected.

The bell crank 28 has a second hole 64 therethrough formed at an end 65 of the upstanding arm 39 which is secured by means of a pivot arm 68 to an upstanding wall 69 of an L-shaped fixed plate 70. The fixed plate 70 is attached to a frame 72 of the removable roof 24 by means of bolts 74, 76 fastened through a flat wall 77 of the fixed plate 70 and spacers 79, 81.

The link member 30 has a second hole 78 formed at a central portion thereof through which is recieved a pivot pin 80 which is secured to the upstanding wall 69 of the fixed plate 70. A second end 82 of the link member 30 has a third hole 84 formed therein through which is received a pivot pin 86 which is secured to a first end 88 of a locking rod 90.

The mechanical linkage provided by pivot pins 54, 62, 68, 80 and 86 provides that when the lever arm 26 is pivoted from the latched or closed position shown in solid lines to the unlatched or open position shown in phantom lines, the bell crank 28 also pivots to an open position 28a shown in phantom lines and the link member 30 cooperatively pivots to an open position 30a shown in phantom lines, thus pulling the locking rod 90 in the direction shown by arrow 92 to an unlocked position. In the open position, the resilient pad 46 on the bell crank stop member 42 is released from contact with the flat surface portion 48 of the fixed frame of the automobile thus permitting the removable roof 24 to be detached from the frame 27 of the automobile 10.

As seen in FIG. 5, an end 94 of the locking rod 90 extends beyond the end of the frame 72 of the removable roof 24 when the latching mechanism 22 is in the closed or latched position. The end 94 which extends beyond the frame 72 is received in a hole 96 in the frame 27 of the automobile 10. Thus, a rear wall 97 of the removable roof 24 is secured by the latching mechanism 22. A side wall 98 of the removable roof 24 which extends longitudinal along the center of the automobile 10 has two ears 100, 102 which project beyond the frame 72 of the removable roof 24 and which are received in slots 104, 106 in the frame 27 of the automobile 10 along a center solid and stationary roof portion 107. Thus the removable roof 24 is prevented from dislodging except in a lateral direction toward the side of the automobile 10.

Referring back to FIG. 2, it is seen that there is a third hold 108 provided in the lower arm 26 at an end of the handle portion 32 which is aligned with a similar threaded hole 110 in the flat wall 77 of the fixed plate 70 so that a fastening device 112 such as a screw with a threaded end 113 can be inserted through the handle portion 32 and secured to the plate 70 such as by means of a mating thread connection to secure the handle portion 32 immobile in the closed position while the fastening member 112 is in place.

In accordance with this invention the fastening screw 112 embodies means to impede or hamper unauthorized removal, namely, a specially keyed head 114 shown best in FIGS. 3, 4, and 5.

The usual Allen head wrench has intermating male and female hex-shaped parts. The usual stud or stove bolt has a head shaped to provide a wrench mating configuration, such as a square, hexagonal or octagonal shape. Other conventional mating shapes are represented by Phillips head screw drivers wherein a fluted rod mates with a complementary shaped recess.

The anti-tamper head provided in the screw 112 does not fit or engage with any of such conventional or commonly available tools, whether an Allen head wrench, a Phillips head screw driver or an end wrench of an adjustable Crescent wrench. Rather an enlarged smooth cylindrically-shaped embossment is provided on the end of the screw and has a hexagonal walled recess 116 formed therein. Projecting into the center of the recess is a pin or lug 118 having a selected geometric shape in cross-section, for example, a circular shape. Thus, in the end view of FIG. 5 there is shown a cylindrical shaped center lug 118 disposed on the screw axis, surrounded by an annular space 117 bounded by a hexagonal inside wall 116 formed by its embossment 115. The embossment 115 has an end 127 which is disposed to be essentially co-planar with the end 129 of the lug 118, thereby to defeat any attempts to gain a purchase on the head 114 with any conventional tool.

To actuate the screw 112 a special tool 119 having a complementary actuating head 131 is provided. The tool head 131 has a hexagonal outer surface 133 of an outer diameter sized to fit in the recess 116 of the screw head 114. Inwardly, the tool head is formed with a recess or socket 120 having a geometric shape selected to be complementary to the cross sectional shape of the lug 118. The spacing dimension between the recess 116 and the outer diameter peripheral surface 133 is such as to form an annular flange 135 which will fit into the annular space 117 on the screw head 114.

The tool head 131 is thus so characterized that it has little, if any, actuating capability with respect to any commonly known form of screw or bayonet-type fasteners and virtually forms a security key which is sufficiently distinctive to enhance the tamper-proof nature of the screw 112.

FIG. 4 shows the manner in which a socket 120 in the special wrench tool 119 mates with the socket 116 and socket head pin 118 such that the screw fastener can be easily rotated by means of the special tool 119. As seen in FIG. 3, the tool 119 is of a convenient size which is easily attached to a key-ring 121 by means of a hole 122 through an end thereof and which can be carried by the user along with his other keys 123.

As seen in FIGS. 2, 3 and 4, the head 114 of the fastening screw 112 can be further modified by providing a rounded edge 124 at the top of the head 114. There is oftentimes a plastic protective coating 125 covering the handle portion 32 of the lever arm 26 which can have an enlarged opening 126 therein such that part of the head 114 can be countersunk into the handle portion 32. In this manner, the head 114 will not present a flat surface which can be gripped by a pliers or other similar tool to rotate the screw fastener 112 when it is secured in its countersunk position. Thus, removal of the screw is effectively prohibited unless the specially provided tool 120 is utilized.

The length of the screw fastener 112 is designed such that the threaded end 113 extends a sufficient distance through the plate 70 so as to add approximately 30 seconds to the normal removal process of the roof 24 by a person in possession of the special wrench tool 120.

To replace and secure a removed roof 24 into the frame 27 of the automobile 10, the roof 24 is positioned near the opening in the automobile roof frame 27 such that the latching mechanism 20 is on the bottom side and an either transparent or opaque roof covering 128 is on the top side. The inner longitudinal side wall 98 of the removable roof 24 is positioned adjacent the center roof portion 107 of the frame 27 such that the two ears 100, 102 can be slipped into the slots 104, 106 in the frame 27 during a lateral movement of the roof 24. At this point the interior side wall 98 of the roof 24 is secured in place and restrained from any movement except for a lateral movement toward the side of the car. An exterior side wall 130 of the removable roof 24 which has the latching mechanism 20 adjacent thereto, is held slightly above its final secured position such that a restraining guide pin 132 attached to the frame 72 of the roof 24 can be inserted into a hole 134 in the frame 27 of the automobile 10. The guide pin 132 has a generally pointed front end 136 to assist in the proper alignment of the guide pin 132 and the hole 134. With the guide pin 132 inserted in place, the exterior side wall 130 of the roof 24 is restrained from all lateral and longitudinal movement and can only be moved in a vertical direction.

Next, the latching mechanism 20 which is in the open position is moved to the closed position by applying an upward pressure on the handle portion 32 of the lever arm 26. This causes the resilient pressure pad 46 to abut against the flat surface portion 48 of the frame 27 of the automobile 10 such that the exterior side wall 130 of the roof 24 is prevented from moving in the vertical direction. At the same time, the locking rod 90 is moved to a rearward position so that the end 94 projects into the hole 96 in the frame 27 of the automobile 10 to secure the rear wall 97 against movement.

To secure the latching mechanism 22 in the closed or latched position, the fastening screw 112 is inserted through the hole 108 in the handle portion 32 of the lever arm 26 and is threaded through the hole 110 in the flat wall 77 of the L-shaped stationary plate 70. The fastening screw 112 with the specially keyed head 114 is rotated by means of the keyed tool 119 until the head 114 is seated in the enlarged opening 126 in the coating 125 on the handle portion 32 so that the fastening screw 112 cannot be removed without using the keyed tool 119.

The entire replacement process of the roof 24 should take only 30 to 35 seconds, most of the time being spent in screwing the fastening screw 112. To detach the roof 24 from the frame 27 of the automobile 10, the steps are reversed. Thus, a locking system 138 is provided to be used with a latching mechanism 22 which is secured to a frame 72 and which has a lever handle 32 that pivots between an open and a closed position which comprises a fastening device in the form of a threaded screw member 112 having a specially keyed head 114, a tool 119 having an end engageable with the specially keyed head 114 of the fastening device 112, a first hole 108 formed in the lever arm 26 at an end opposite the pivots 54, 62, a second hole 110 formed in the frame 72 aligned with the first hole 108 when the lever arm 26 is in the locked position, the second hole 110 having a threaded internal diameter such that when the lever arm 26 is in the locked position, the screw fastener 112 can be pushed through the first hole 108 and threaded through second hole 110, by using the tool 119, to retain the lever arm 26 in the locked position. Also, the head 114 of the screw 112 can be countersunk into the lever arm 26 and the head 114 can be rounded to remove any flat gripping surfaces to further hinder the unauthorized removal of the roof 24.

The screw fastener 112 is to be of a length of require approximately 30 seconds of manual turning with the tool 119 to disengage the screw fastener 112 from the second hole 110.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim as my invention:

1. For use with an automobile roof having a plurality of ears which cooperate with a latch mechanism to retain said roof in position on an automobile, said latch mechanism secured to the frame of said removable roof and having a lever arm which is pivotally attached near a first end and is free to move at a second end between a locked position and an unlocked position and having a relatively flat face at said second end being exposed to a user of said automobile and forming a part of a gripping area for moving said lever arm, a locking system comprising:

a fastening device in the form of a threaded screw member having an axially elongated threaded body portion and a head portion at one end, said head portion being diametrically larger than said body portion and having a generally circular circumference and a generally hemispherical shape with only a single flat surface at the point of attachment to said body portion, said head portion having an axial opening extending thereinto opposite said body portion, said opening having at least one flat internal surface, a tool having an end engageable with said flat internal surface in said head portion of said fastening device, a first hole having a diameter larger than said body portion, but smaller than said head portion in said lever arm flat face and extending through said lever arm at said second end, said first hole having a diametrically enlarged area at said flat face a part of the depth of said first hole and having a diameter large enough to receive said head portion and of a depth sufficient to allow a portion of said head portion to be recessed below said flat surface, a second hole formed in said automobile roof frame aligned with said first hole when said lever arm is in the locked position, said second hole having a threaded internal wall complementary to said body portion whereby when said lever arm is in said locked position, said screw member can be inserted through said first hole and threaded to engage said wall of said second hole, by using said tool, to retain said lever arm in said locked position.

2. The invention of claim 1, wherein said screw member is of a length so as to require approximately 30 seconds of manual turning with said tool to disengage said screw member from said second hold.

3. The device of claim 1 wherein said opening in said head portion has a central post member therein and said tool end has a complementary recess therein to receive said post.

4. The device of claim 1 wherein said head portion is longer in an axial direction than the depth of said diametrically enlarged portion such that said opening in said head portion remains exposed above said flat face of said lever arm.

* * * * *